(No Model.) 2 Sheets—Sheet 1.
I. R. LAUX.
Wringer and Bench.
No. 237,556. Patented Feb. 8, 1881.
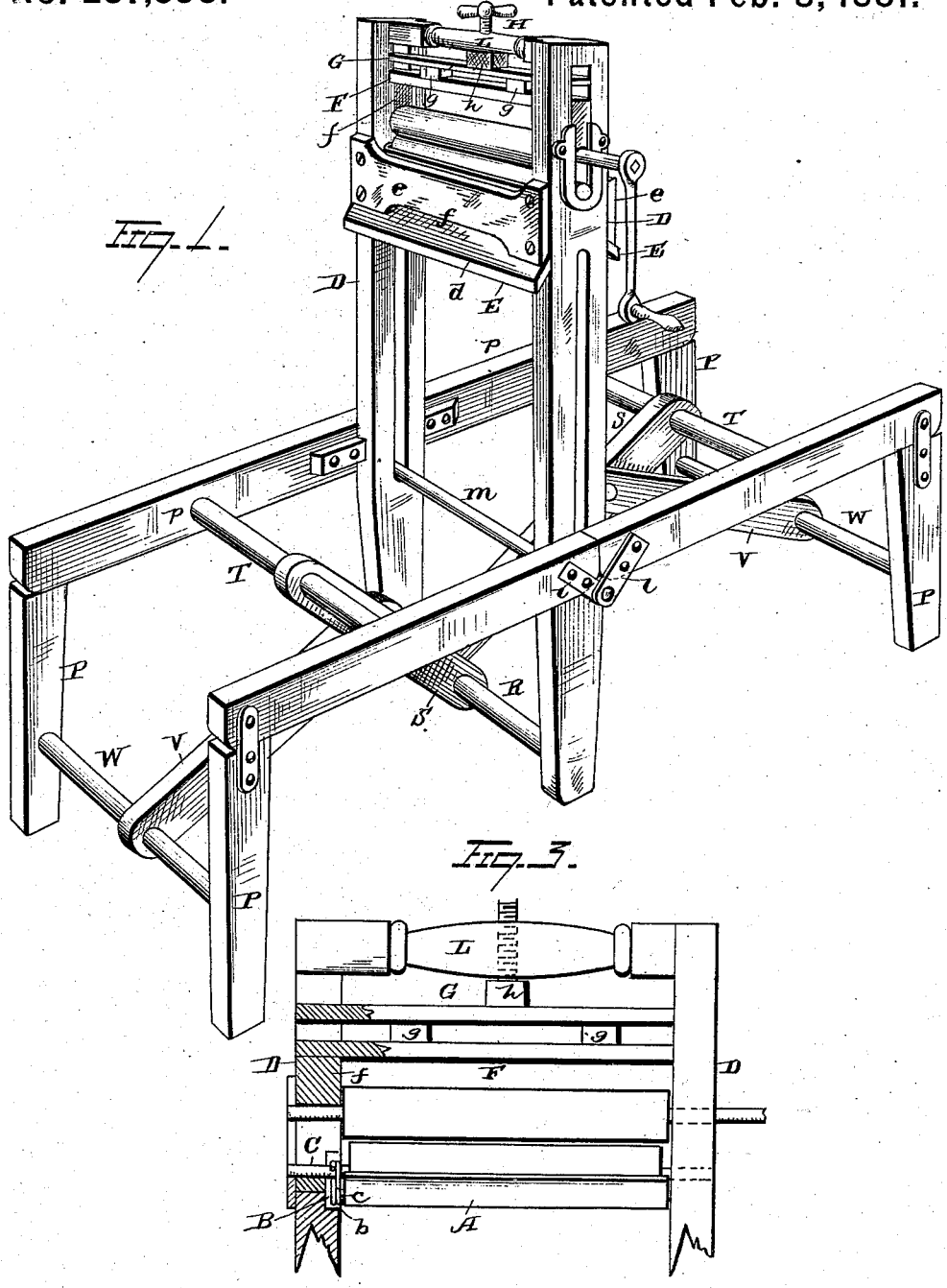
WITNESSES
INVENTOR
Isaac R. Laux.
By H. A. Symons,
ATTORNEY

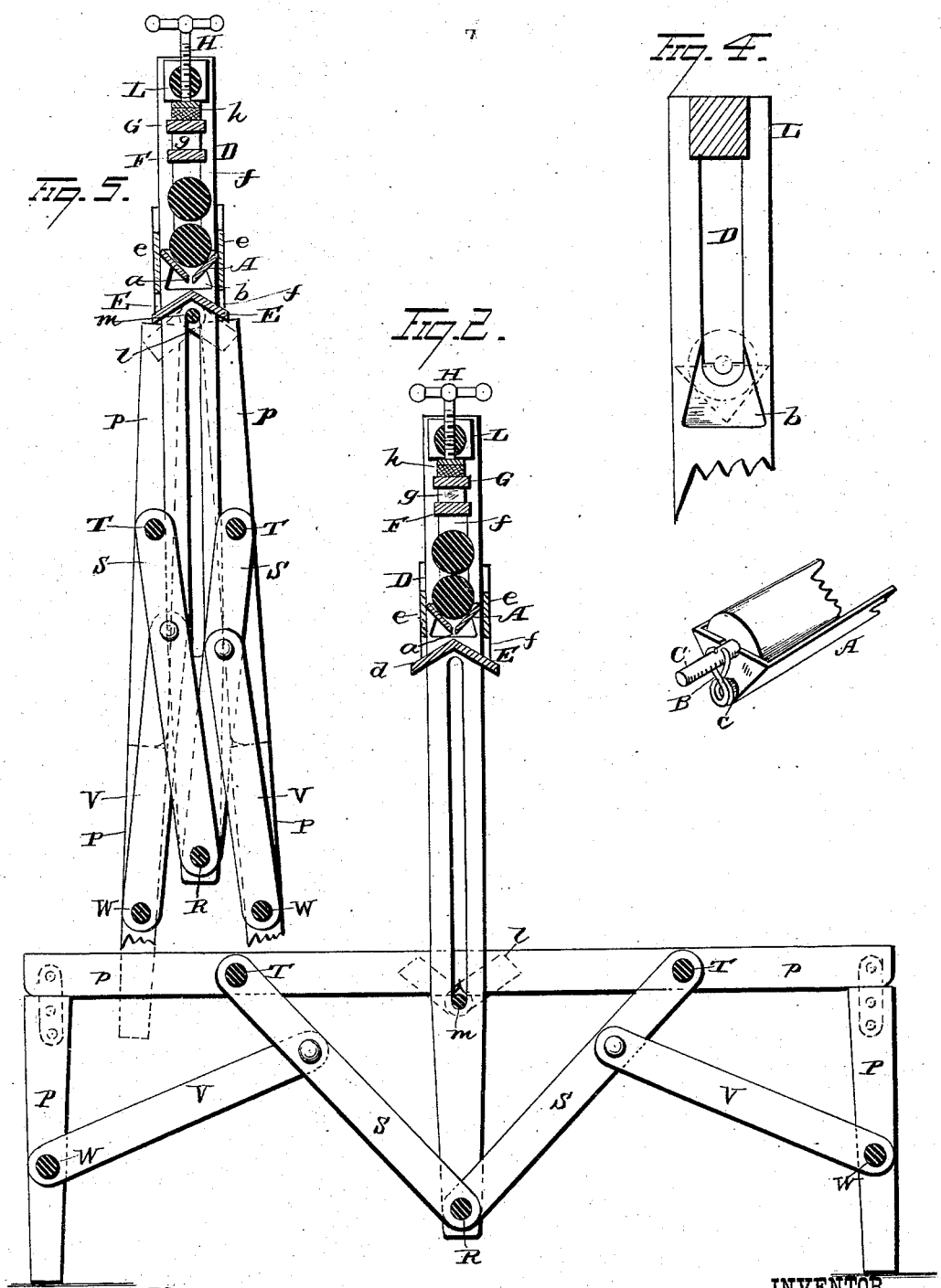

UNITED STATES PATENT OFFICE.

ISAAC R. LAUX, OF WADSWORTH, OHIO.

WRINGER AND BENCH.

SPECIFICATION forming part of Letters Patent No. 237,556, dated February 8, 1881.

Application filed September 10, 1880. (No model.)

*To all whom it may concern:*

Be it known that I, ISAAC R. LAUX, of Wadsworth, in the county of Medina and State of Ohio, have invented certain new and useful Improvements in Wringers and Wash-Tub Benches; and I do hereby declare the following to be a full, clear, and exact description of the invention, such as will enable others skilled in the art to which it pertains to make and use it, reference being had to the accompanying drawings, which form part of this specification.

The object of my invention is to provide an improved form of wringer and an improved folding wash-tub bench adapted to be used in connection with the wringer.

The improvement in the wringer consists in providing a drip-pan located beneath the lower roller with spring-arms, respectively secured to the two ends of the pan and embracing the roller-shaft, said pan being adapted to have a restricted tilting movement by being carried around with the roller-shaft until stops formed on the ends of the pan engage with the roller-standards and overcome the friction of said spring-arms on the roller-shaft.

The improvement in the wash-tub bench consists in the combination of two benches having their inner extremities pivoted to the roller-standards and meeting in a butt-joint, the outer extremities of said benches being provided with folding legs connected by pivotal braces to the roller-standards and the side pieces of the benches. These benches are adapted to be folded up against the roller-standards with their inner extremities against the upper portion of the standards and their outer extremities against the lower portion of the standards.

Referring to the drawings, Figure 1 is a view in perspective of the invention. Fig. 2 is a central longitudinal sectional view of the same. Fig. 3 is a detail view, showing the drip-pan in side elevation and its attachment to the roller-shaft, the upright side piece of the chute being removed and portions of the roller-standards being broken away. Fig. 4 is a detail view, in vertical transverse section, of one of the side recesses of the roller-standards, showing the pan in end elevation and provided with its spring-arms embracing the roller-shaft. Fig. 5 represents the two benches folded against the roller-standards.

The drip-pan A is formed V-shaped in cross-section, and has its bottom provided with a longitudinal discharge-opening, $a$. Each end of the pan is provided with spring-arms B, which extend upwardly from the lower central line of the pan and embrace the lower roller-shaft, C. The inner sides of the two roller-standards D are provided with recesses $b$, in which the springs-arms are fitted. These arms embrace the shaft with sufficient friction to carry the pan with said shaft as the latter rotates until stops $c$ projecting from the ends of the pan engage with the corresponding walls of the standard-recesses, thereby overcoming the friction of the spring-arms on the roller-shaft and arresting the tilting movement of the pan.

Two diverging chutes, E, are located beneath the pan, and are respectively formed with an inclined bottom, $d$, and an upright side piece, $e$, the latter being provided with an outlet, $f$, formed between its lower edge and the inclined bottom of the chute.

The wringer being in use, to wring clothes from a tub supported upon the bench on one side thereof into a tub supported on the bench on the other side of the wringer, the operation is as follows: By turning the roller-crank in the proper direction the spring-arms are carried around with the lower roller-shaft by reason of their tension on the latter, and the drip-pan is carried with said arms in a tilting movement to the side of the wringer at which the clothes are to be introduced between the rollers. This tilting movement of the pan causes its discharge-opening to be brought in vertical line over the corresponding chute, and the pan is arrested in its movement by engagement of its stops with the walls of the standard-recesses. The pan is maintained in this tilted position by the tension of the spring-arms on the roller-shaft while the latter is being actuated. The water which drips from the rollers is caught by this pan, and, passing out through the discharge-opening of the latter, is conducted down along the inclined bottom of the chute, and finally passes out from the side outlet into the tub from which the clothes are wrung.

The upper roller-shaft is provided with upper journal-boxes, *f*, upon which rest the extremities of lower cross-bar, F. Between this lower cross-bar and the upper cross-bar, G, are two rubber cushions, *g*, respectively located about midway between the center and the lower extremities of the lower cross-bar. The upper cross-bar rests entirely upon these two cushions, and a single rubber cushion, *h*, is located upon the central portion of its upper side. A thumb-screw, H, has screw-thread engagement with a top bar, L, and the lower end of this screw bears upon said central cushion. This construction causes the upper roller to be pressed with a greater or less force down upon the lower roller, and the location of the rubber cushions between the two spring cross-bars is peculiarly adapted to cause said bars to exert a high elastic force upon the rollers. Locating the two spring-cushions at points practically midway between the two roller-standards and the center of the lower cross-bar causes the latter to exert its entire elastic force; and by locating the single spring at the center of the upper bar the latter has its central portion depressed under strain.

The two wash-tub benches are made in duplicate form, and have their inner extremities pivoted by metallic straps *l* to a transverse rod, *n*, and adapted to meet in a butt-joint. This rod fits in longitudinal slots *m* formed in the roller-standards. The outer extremities of the benches are provided with legs P, hinged to the side pieces, *p*, and adapted to be folded in line with the latter. A round, R, connects the lower extremities of the roller-standards, and to this round are pivoted the lower extremities of the two inner braces, S. In each bench the upper extremity of the brace S is pivoted to the round F, which connects the side piece, *p*. At a point near the middle or upper portion of each inner brace, S, the upper extremity of an outer brace, V, is pivoted, and the lower extremity of this outer brace is pivoted to a round, W, which connects the two legs of each bench. These two benches are adapted to be folded up against the roller-standards by forcing the transverse rod upward in the slots of the standards. The outer and inner pivotal braces of each bench fold together and the hinged legs are brought into line with the side pieces. The inner extremities of the benches fold up against the upper portion of the roller-standards and their outer extremities fold against the lower portion of said standards. When the benches are down in operative position stops *r*, secured to the inner sides of the side pieces, *p*, bear against opposite sides of the roller-standards, thereby maintaining the benches the more firmly in position when under strain of heavy tubs.

Having fully described my invention, what I claim as new, and desire to secure by Letters Patent, is—

1. The combination, with a drip-pan located beneath the lower roller, of spring-arms which embrace the roller-shaft, said drip-pan being adapted, by the friction of the arms on the roller-shaft, to be tilted as it is carried by said shaft respectively to one side or the other of the roller, substantially as set forth.

2. The combination, with a drip-pan provided with arms which embrace the lower roller-shaft, of stops projecting from the pan ends and adapted to engage with the roller-standards after completing a limited tilting movement to one side or the other of the roller, substantially as set forth.

3. The combination, with a drip-pan having its ends provided with arms which embrace the roller-shaft, of roller-standards provided with side recesses in which the arms swing, said arms being adapted, by their friction upon the roller-shaft, to carry the pan with the latter in its rotary movement until their friction is overcome by engagement of the pan-stops with the recess-walls, substantially as set forth.

4. The combination, with longitudinally-slotted roller-standards and a transverse rod having its ends project through the slots, of two benches having their inner extremities pivoted to said projecting ends and meeting in a butt-joint, and legs hinged to the outer extremities of the benches, and pivotal braces which connect the leg-rounds to the roller-standards and to the side pieces of the benches, substantially as set forth.

5. The combination, with longitudinally-slotted roller-standards, a transverse rod fitted in the slots, and two benches having their inner extremities pivoted to the rod and meeting in a butt-joint, of inner braces having their lower extremities pivoted to a lower round of the standards and their upper extremities pivoted to rounds secured to the side pieces of the benches, and outer braces, respectively having one extremity pivoted to said inner braces and the opposite extremity pivoted to rounds secured to the hinged legs, substantially as set forth.

In testimony that I claim the foregoing I have hereunto set my hand this 31st day of August, 1880.

ISAAC R. LAUX.

Witnesses:
ED. L. WHITE,
JOHN A. CLARK.